United States Patent [19]
Woodruff

[11] 4,078,222
[45] Mar. 7, 1978

[54] DIRECTION DETERMINING APPARATUS

[75] Inventor: Thomas E. Woodruff, Nashua, N.H.

[73] Assignee: The United States of America as represented by the Secretary of the Navy, Washington, D.C.

[21] Appl. No.: 878,506

[22] Filed: Nov. 20, 1969

[51] Int. Cl.² .............................................. G01S 3/80
[52] U.S. Cl. ................................ 340/6 R; 340/16 R
[58] Field of Search .......................... 340/2, 6 R, 16 R

[56] References Cited
U.S. PATENT DOCUMENTS

| 3,182,283 | 5/1965 | Ellingson et al. | 340/6 |
| 3,286,224 | 11/1966 | Zefting | 340/6 |
| 3,461,421 | 8/1969 | Stover | 340/2 |

Primary Examiner—Richard A. Farley
Attorney, Agent, or Firm—Edgar J. Brower; Henry Hansen; B. Frederick Buchan, Jr.

[57] ABSTRACT

A system for ascertaining the bearing of a remotely-located acoustic signal source including a hydrophone array having an omnidirectional hydrophone and a pair of orthogonally-oriented directional hydrophones all of whose output signals are applied to a processor which combines the output signals of the directional hydrophones to provide a signal shifted in phase relative to the omnidirectional output signal by an amount equal to the bearing angle and which resolves the phase-shifted signal by phase detection into a pair of signals representative of the sine and cosine of the bearing angle. The sine and cosine signals are processed by integrators and a bearing angle computer to provide an output signal indicative of the bearing angle to a display. A second embodiment of the processor combines the directional hydrophone output signals into a pair of phase shifted signals for resolution, one leading and the other lagging the phase of the omnidirectional signal by an amount equal to the bearing angle.

11 Claims, 2 Drawing Figures

DIRECTION DETERMINING APPARATUS

STATEMENT OF GOVERNMENT INTEREST

The invention described herein may be manufactured and used by or for the Government of the United States without the payment of any royalties thereon or therefor.

BACKGROUND OF THE INVENTION

This invention generally relates to apparatus for determining the direction of a remotely-located signal source and, more particularly, to a system for determining the bearing of a remotely-located, underwater signal source.

One method for ascertaining the bearing of a remotely located soure of acoustic signals $f(t)$ such as characteristic noise generated by boats or submarines and the like contemplates the use of an orthogonally-oriented pair of directional hydrophones wherein the one hydrophone provides an output signal varying as a function of both $f(t)$ and the cosine of the angle of arrival $\theta$ and the other hydrophone provides an output signal varying as a function of both $f(t)$ and $\sin\theta$. The ratio of the output signals provides a quantity which is a function of tangent of the bearing angle or angle of arrival $\theta$. The use of conventional apparatus for time-compressing received signals in cases where the channels are not exactly matched can distort the amplitudes of the directional hydrophone output signals, introduce unequal signal-to-noise ratios and cause errors of impermissible magnitude in the computation of the bearing angle.

SUMMARY OF THE INVENTION

It is the general purpose of this invention to provide an improved, more accurate apparatus for determining the bearing of a remotely-located source of acoustic signals or characteristic noise and, more particularly, to provide apparatus wherein time-compression techniques may be utilized. Briefly, the general purpose of the invention may be accomplished by vectorially combining the directional hydrophone output signals to provide a combination signal having a phase shifted by the magnitude of the bearing angle relative to the omnidirectional hydrophone output signal and from which may be extracted signals indicative of the bearing angle. More particularly, the invention comprehends a system including a processor wherein the bearing angle information is contained in a signal of shifted phase which signal may then be time compressed and resolved into sine and cosine components, the omnidirectional signal being time compressed and used to eliminate quadrant ambiguity. Further, the invention comprehends a system processor including a resolver having phase detectors for detecting the phase difference between the omnidirectional signal and the combination signal. Additionally, the invention contemplates a system including a further improved processor wherein the directional hydrophone output signals are combined to provide for resolution a pair of signals respectively leading and lagging a reference signal by a phase angle equal to the bearing angle.

DESCRIPTION OF THE PREFERRED EMBODIMENT

Figure 1:
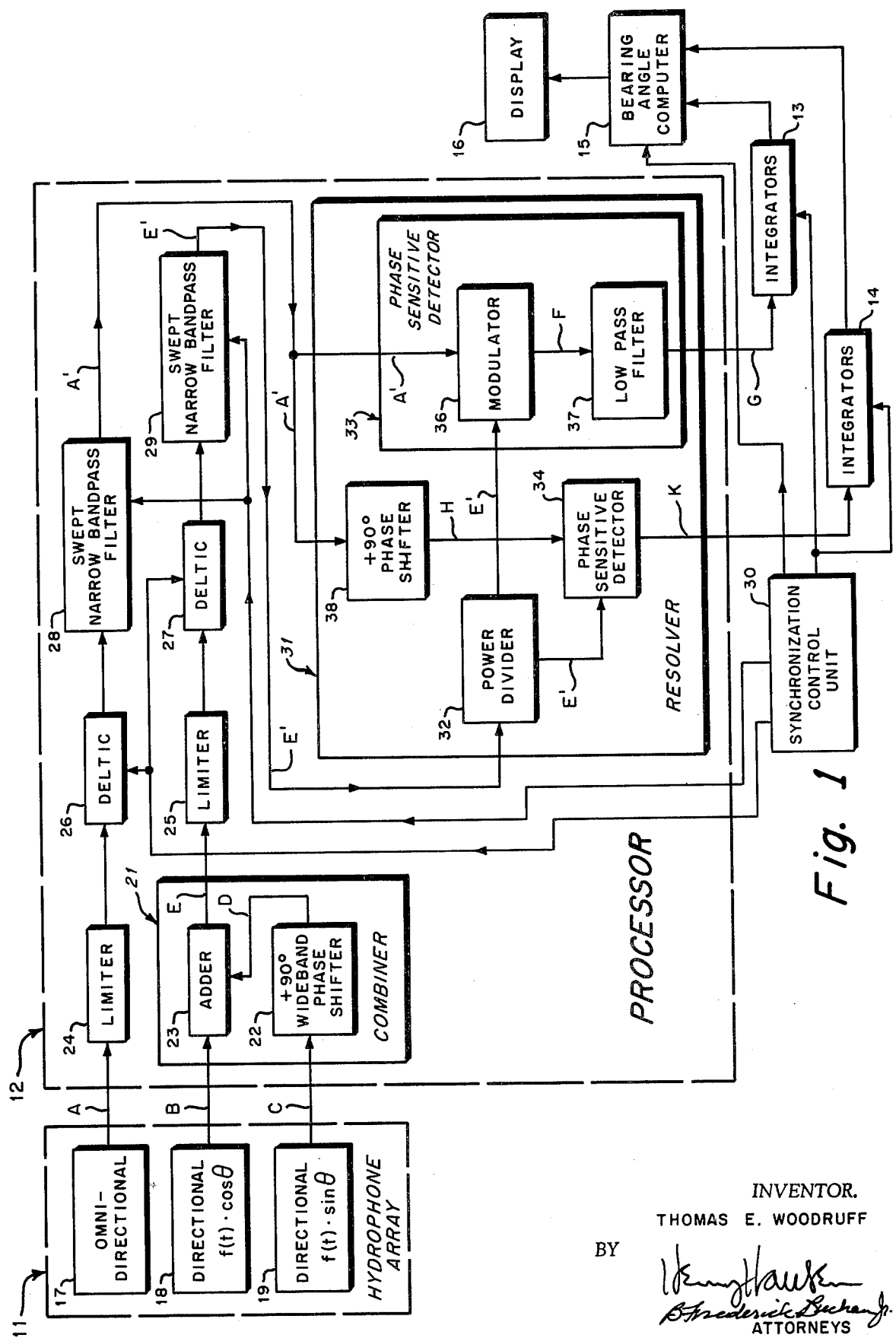
FIG. 1 represents a block diagram of a system according to the invention for determining the bearing of a remotely-located signal source.

Referring now to FIG. 1, the apparatus includes a hydrophone array 11 whose output signals are applied to the processor 12 for combination, time compression and resolution into a pair of signals which are indicative of the sine and cosine of the bearing angle of the signal source relative to the array 11 and which are applied to a pair of integrators 13 and 14. The integration times for the integrators 13 and 14, of course, depend upon the signal-to-noise ratios of the input signals. Generally, longer integration times such as several seconds are desirable for weaker signals. The output signals of the integrators 13 and 14 are applied to a bearing angle computer 15 which first computes the ratio of the sine of the bearing angle to the cosine of the bearing angle and then ascertains the angle whose tangent is equal to that ratio and provides an output signal indicative of the angle to a display device 16.

More particularly, the hydrophone array 11 includes an omnidirectional hydrophone 17 and a pair of directional hydrophones 18 and 19 having orthogonally-oriented patterns of sensitivity. The hydrophones 17, 18 and 19 are mounted in fixed relation to each other in the array 11 which is positioned underwater to sense impinging acoustic signals. The output signal A of the omnidirectional hydrophone 17 may be considered as being a complex signal equaling the sum of the impinging acoustic signals of differing frequencies in the band of interest expressed as:

$$A = \Sigma_n S_n \cos\omega_n t$$

where $S_n$ is the maximum amplitude of the signal of frequency $\omega_n$ and $t$ equals time. The output signal B of the directional hydrophone 18 may be expressed as:

$$B = \Sigma S_n \cos\omega_n t \cdot \cos\theta$$

where $\theta$ equals the angle of arrival of the acoustic signal of frequency $\omega_n$ measured relative to the heading of the array 11. The array heading can be considered as being coincident with a direction of maximum sensitivity of the directional hydrophone 18. The output signal C of the orthogonally-mounted hydrophone 19 may be expressed as:

$$C = \Sigma_n S_n \cos\omega_n t \cdot \sin\theta.$$

The output signals B and C are applied to a combiner 21 in the processor 12 in order to produce the vectorial combination of the two signals having a phase shift equal to the angle $\theta$ relative to the omnidirectional signal A which is used as a reference signal to eliminate ambiguity. More particularly, the signal C is applied to a plus 90° wideband phase shifter 22 of bandwidth accommodating the band of frequencies of interest and whose output signal may be expressed as:

$$D = \Sigma_n S_n \sin\omega_n t \cdot \sin\theta.$$

The signals B and D are applied to an analog summing device or adder 23 whose output signal represents the analog sum of the signals B and D and may be expressed as:

$$E = \Sigma_n S_n \cos(\omega_n t + \theta).$$

The signal E has a phase difference relative to signal $A$ equal to the bearing angle measured relative to the array heading. Since the bearing angle information has been translated into the degree of phase displacement of the combined signal E relative to the omnidirectional signal A, only zero crossings of the signals contain directional information. The effective three dimensional hydrophone pattern of the signal E can be visualized as a toroid of zero inner diameter resembling a doughnut.

The signals A and E are each applied to a respective single bit, hard limiter 24 and 25 whose series of single bit, variable duration, output signals are applied to respective time-compression devices 26 and 27 whose sample rates are controlled by a synchronizing control unit 30. The deltic output signals are applied to conventional, swept narrow bandpass filters 28 and 29 having mixers receiving a swept variable frequency oscillator output signal from the control unit 30 and providing through narrowband, gaussian, linear phase crystal filters the following time-compressed output signals:

$$A' = \Sigma S_m \cos\omega_m t \text{ and } E' = \Sigma S_m \cos(\omega_m t + \theta),$$

$S_m$ and $\omega_m$ representing the limiter normalized amplitude and time-compressed frequency of the signals in a particular narrowband frequency bin passed by the filters 28 and 29 during a particular time interval of time and collectively representing a particular frequency in the acoustic band of interest.

The signals A' and E' are applied to a resolver 31 providing output signals representative of the bearing angle sine and cosine and gated under the control of the unit 30 to the particular ones of the integrators 13 and 14 associated with the appropriate frequency bin for data in that interval. More particularly, combination signal E' is applied through a power divider 32 to each of a pair of phase sensitive detectors 33 and 34. The signal A' is applied to the detector 33 which may be of a type including a modulator 36 for cross multiplying the signals E' and A' to provide a signal $$F = \Sigma S_m^2 \cos(\omega_m t)\cos(\omega_m t + \theta) = \Sigma S_m^2 [\cos^2\omega_m t \cos\theta - 1/2 \sin 2\omega_m t \cdot \sin\theta]$$

fed through a low-pass filter 37 extracting for application to the integrators 13 an output signal $$G = S \cos\theta$$

wherein S represents an amplitude which is constant because of normalization by the limiters. The signal A' is also applied to a plus 90° phase shifter 38 in order to provide a signal $$H = -\Sigma S_m \sin(\omega_m t)$$

applied to the detector 34 for cross multiplication with the signal E' in order to produce the signal $$J = \Sigma S_m^2 [\sin^2\omega_m t \cdot \sin\theta - 1/2 \sin 2\omega_m t \cdot \cos\theta]$$

from which is extracted by filtering the output signal $$K = S \sin\theta$$

which is applied to the integrator 14.

The computer 15, being synchronized with the sweeping of the filters 28 and 29 and integrators 13 and 14 by the control 30, is supplied with a pair of signals from which it may compute the ratio $(S^2 \sin\theta/S^2 \cos\theta) = \tan\theta$ from which by function generation or reference to a stored table of angles it provides to the display 16 or other utilization device a signal indicative of the bearing angle associated with the particular frequency bin.

Figure 2:
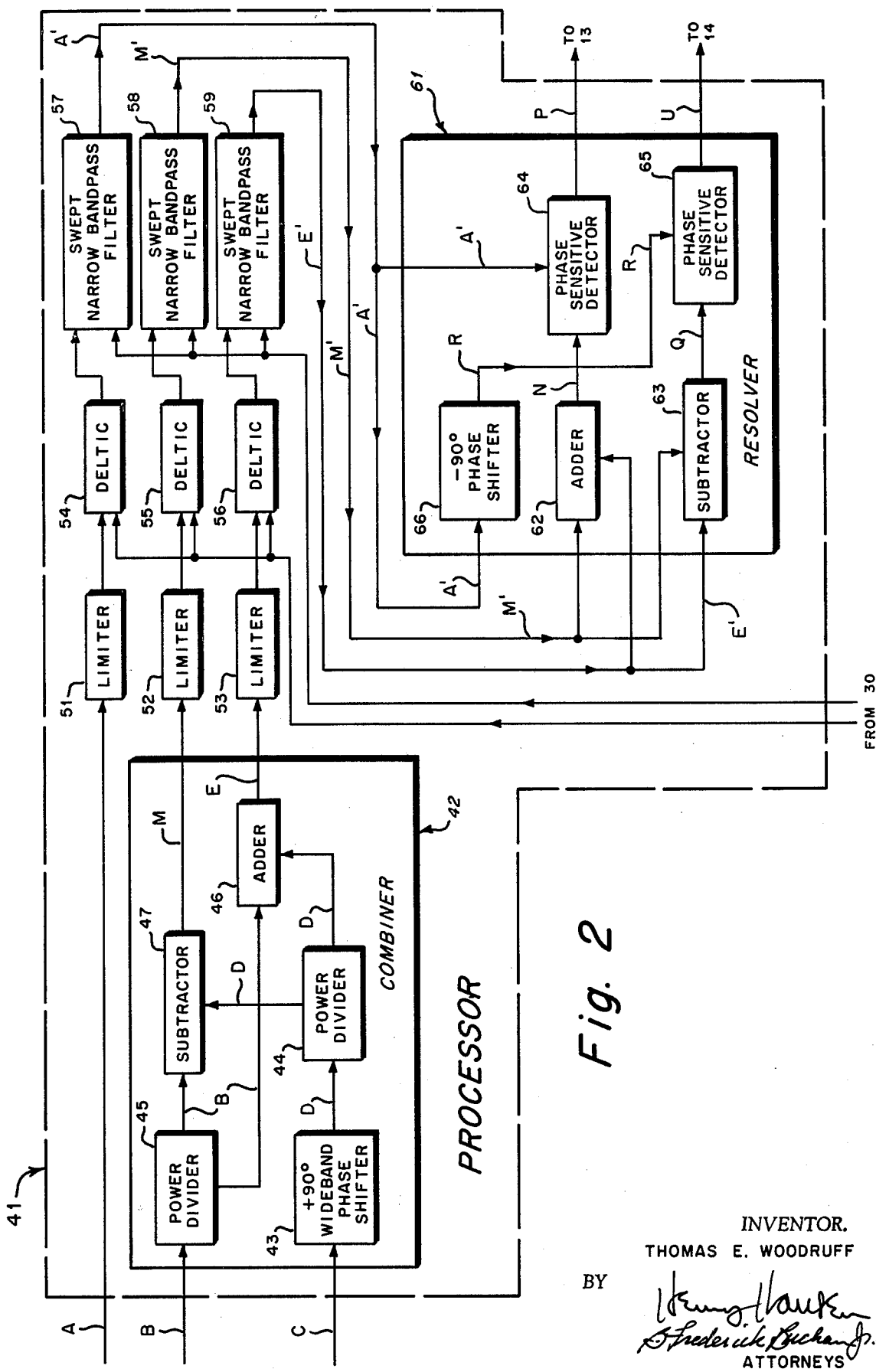
FIG. 2 represents a modified embodiment of a processor of the system of FIG. 1.

The processor 41 of FIG. 2 is characterized by enhanced accuracy when compared to the processor 12 of FIG. 1. Generally, the processor 41 provides a pair of phase-shifted signals, one leading and the other lagging the omnidirectional signal by a phase shift equal to the bearing angle, and resolves the pair of phase-shifted signals to produce, as above, the signals indicative of the sine and cosine of the bearing angle. More particularly, the signals B and C from the hydrophones 18 and 19 are applied to a combiner 42 similar to the combiner 21 except that the signal D from a plus 90° wideband phase shifter 43 and the signal B are each applied to a respective power divider 44 and 45 for application not only to an analog summing device or adder 46 but also to an analog signal subtracting device 47. The adder 46 provides the signal E as does the adder 23 in the processor 12 of FIG. 1. The subtractor 47 provides the following signal $$M = \Sigma S_n [\cos\omega_n t \cdot \cos\theta + \sin\omega_n t \cdot \sin\theta] = \Sigma S_n \cos(\omega_n t - \theta)$$

Each of the signals A, M and E are applied for time compression to single bit, hard limiters 51, 52, and 53 whose output signals are applied to deltic units 54, 55, and 56. The output signals of the units 54, 55, and 56 are filtered by respective swept narrow bandpass filters 57, 58, and 59 in order to provide the time-compressed signals A', $M' = \Sigma S_m \cos(\omega m t - \theta)$ and E' to a resolver 61 for resolution to provide the bearing angle sine and cosine signals to the integrators 13 and 14.

The signals M' and E' are each applied to both an analog summing device or adder 62 and an analog subtracting device or subtractor 63. The adder 62 provides the sum output signal $$N = \Sigma 2S_m \cos\omega_m t \cdot \cos\theta$$

to a phase detector 64 also receiving the compressed omnidirectional signal A' for cross multiplication in order to provide the signal $$O = \Sigma 2S_m^2 \cos^2\omega_m t \cdot \cos\theta$$

which is low-pass filtered to provide the resolver output signal $$P = S \cos\theta$$

which is applied to the integrator 13. The subtractor 63 provides the difference output signal $$Q = \Sigma 2S_m \sin\omega_m t \cdot \sin\theta$$

to another phase detector 65. The compressed omnidirectional signal A' also is applied to a minus 90° phase shifter 66 in order to provide the signal $$R = \Sigma S_m \sin\omega_m t$$

to the phase detector 65. Cross multiplication of the signals Q and R in the detector 65 produces the signal $$T = \Sigma 2S_m^2 \sin^2\omega_m t \cdot \sin\theta$$

which is low-pass filtered to provide the other resolver output signal $$U = S \sin\theta$$

to the integrator 14. It should be noted that in the processor 41 first order phase errors are canceled thereby permitting greater phase tolerance in each individual channel.

It should be noted, of course, that where the bearing angle relative to magnetic North is desired the signals B and C can be corrected for deviation of the array heading from magnetic North as by use of compass driven resolvers. Thereby, an additional phase shift corresponding to the deviation of the heading of the array 11 from magnetic North is introduced into both directional hydrophone output signals.

The directional hydrophones 18 and 19 should be matched in both amplitude and phase shift characteristics. Similarly, the omnidirectional hydrophone 17 should have a phase shift characteristic similar to those of the directional hydrophones 18 and 19. Since the amplitude response of the omnidirectional hydrophone is multiplied with the combined outputs of both directional hydrophones, it cannot affect the ratio of the bearing angle sine and cosine signals.

The invention enables the provision of apparatus of increased accuracy which is well adapted for using time-compression techniques to overcome the adverse effects of low signal-to-noise ratios. Further, the invention permits the use of shorter delay lines with smaller time-compression devices in that, since the phase information is contained in zero crossings, a hard limiter may be used at the deltic input to provide single bit information. Processing the directional output signals in a manner preserving the amplitude information as to each directional output signal can require the inclusion of an analog-to-digital converter prior to each time-compression device which could require several bits in order to store one item of amplitude information. The invention eliminates the necessity for using analog-to-digital converters since a hard limiter provides single bit information.

Since the processor 41 of FIG. 2 causes first-order phase errors to be canceled, a greater phase tolerance in each individual channel is permitted. Additionally, the processor such as 41 of FIG. 2 has increased sensitivity in the presence of noise when compared with the processor such as 12 of FIG. 1. For example, a three decibel improvement in sensitivity is possible before cross-multiplying in the extractors or resolvers 31 or 61 at the output of the swept narrow bandpass filters 28, 29 or 57, 58, 59.

It should be noted that other configurations than that specifically disclosed may be utilized in processing the output signals indicative of the sine and cosine of the bearing angle for a particular frequency bin. For example, instead of pluralities of paralleled integrators such as 13 or 14 gated on by the control unit 30 in synchronization with the sweeping of the filters such as 28 and 29 of FIG. 1, the data may be converted to digital form and applied directly to a computer for storage at a succession of frequency bin addresses controlled by the control unit 30 in synchronization with the sweeping of the swept filters. Such a computer would be programmed to digitally integrate the data for each separate frequency bin as by parallel addition of successive words of data and to derive the bearing angle for the source of the signal having a frequency in the particular frequency bin of interest when indicated by the surpassing of a predetermined threshold level for the integrated data. Valuable savings of required numbers of bits are realizable in this sort of embodiment of the invention when compared to the numbers required by configurations wherein the hydrophone outputs are applied to banks of multiple filters and the amplitudes of the filtered signals detected and converted to digital form. It should be further noted that optical processors or apparatus for deriving fast Fourier transforms or other multiple filtering means may be utilized in place of the swept filters disclosed in order to quickly process data for a plurality of frequency bins enabling detection of those potential positions where there may be a source of a signal or signals in particular frequency bins of interest.

Obviously many modifications and variations of the present invention are possible in view of the above teachings. It is therefore to be understood that within the scope of the appended claims the invention can be practiced otherwise than as specifically described.

What is claimed is:

1. Direction determining apparatus comprising:
   sensor array means for sensing impinging acoustic signals from a remotely located source including an omnidirectional sensor providing an omnidirectional signal and a pair of orthogonally arranged directional sensors providing directional signals;
   combiner means for vectorially combining said directional signals for providing a combiner output signal having a phase shift relative to said omnidirectional signal of a magnitude indicative of the bearing angle of the source;
   resolver means receiving said omnidirectional signal and said combiner means output signal for providing a pair of resolver output signals indicative respectively of the cosine and the sine of the phase shift; and
   computer means receiving said cosine and sine resolver output signals for providing an output signal indicative of the bearing angle.

2. Apparatus according to claim 1 wherein said combiner means comprises:
   first phase shifting means receiving one of said directional signals for providing a phase shifted directional signal shifted 90° in phase; and
   adder means for combining the other said directional signal and said phase shifted directional signal and providing said combiner output signal.

3. Apparatus according to claim 2 wherein said resolver means comprises:
   second phase shifting means receiving said omnidirectional signal for providing a phase shifted omnidirectional signal shifted 90° in phase; and
   first and second phase detector means each connected to said combiner means to receive said combiner output signal and each connected to receive a respective one of said omnidirectional signal and said phase shifted omnidirectional signal for extracting and providing a respective one of said cosine and sine resolver output signals.

4. Apparatus according to claim 3 wherein said first and second phase detector means each comprise:
   modulator means for receiving and cross multiplying said combiner output signal and said respective one of said omnidirectional signal and said phase shifted omnidirectional signal for providing a modulator output signal; and low-pass filter means connected to receive said modulator output signal for providing said respective one of said cosine and sine resolver output signals.

5. Apparatus according to claim 4 further comprising: first and second time-compression means connected to receive respective ones of said omnidirectional signal and said combiner output signal for providing said signals received to said resolver means in time compressed form.

6. Apparatus according to claim 5 wherein said time-compression means each comprise:
limiter means for hard limiting and providing a series of single bit output signals indicative of said respective one of said omnidirectional signal and said combiner output signal received;
a time-compression unit for receiving and compressing said series of single bit output signals of said limiter means and for providing a unit output signal; and
narrow bandpass filter means for receiving and filtering said unit output signal for providing said signal received in said time compressed form.

7. Apparatus according to claim 1 further comprising:
said combiner means including means providing first and second combiner output signals one leading and the other lagging said omnidirectional signal in phase by the bearing angle; and
said resolver means receiving said first and second combiner output signals and said omnidirectional signal and providing said sine and cosine resolver output signals.

8. Apparatus according to claim 7 wherein said combiner means comprises:
first phase shifting means receiving one of said directional signals for providing a phase-shifted directional signal shifted 90° in phase;
subtractor means for combining the other of said directional signals and said phase-shifted directional signal to provide one of said first and second combiner output signals; and
adder means for combining said other of said directional signals and said phase-shifted directional signal to provide the other of said first and second combiner output signals.

9. Apparatus according to claim 8 wherein said resolver means comprises:
adder means for receiving and summing said first and second combiner output signals to provide an adder output signal;
subtractor means for receiving and subtracting said first and second combiner output signals to provide a subtractor output signal;
second phase shifting means receiving said omnidirectional signal for providing a phase-shifted omnidirectional signal shifted minus 90° in phase;
first phase detector means connected to receive said adder output means connected to receive said adder output signal and said omnidirectional signal for extracting and providing said cosine resolver output signal; and
second phase detector means connected to receive said subtractor output signal and said phase-shifted omnidirectional signal for extracting and providing said sine resolver output signal.

10. Apparatus according to claim 9 further comprising:
a plurality of time-compression means each for time compressing a respective one of said omnidirectional signal and said first and second combiner output signals to provide said signal to said resolver means in time compressed form.

11. Apparatus according to claim 10 wherein said time-compression means comprise:
limiter means for hard limiting and providing a series of single bit output signals indicative of said respective one of said omnidirectional signal and said first and second phase-shifted combiner output signals received;
a time-compression unit for receiving and comprising said series of single bit output signals of said limiter means and for providing a unit output signal; and
swept narrow bandpass filter means for receiving and filtering said unit output signal for providing said signal received in said time compressed form representative of data pertaining to a plurality of frequencies in a band of interest.

* * * * *